United States Patent [19]

Jensen

[11] 4,055,747
[45] Oct. 25, 1977

[54] APPARATUS AND METHOD FOR THE SYNCHRONOUS READING OF DATA FROM A PUNCHED CARD

[75] Inventor: Olav V. Jensen, West Vancouver, Canada

[73] Assignee: Ebco Industries, Ltd., Richmond, Canada

[21] Appl. No.: 686,242

[22] Filed: May 13, 1976

[51] Int. Cl.² .................. G06K 7/10; G08C 8/06; G06K 7/08
[52] U.S. Cl. ..................... 235/61.11 E; 250/555; 235/61.11 D
[58] Field of Search ............... 235/61.11 E, 61.11 D; 200/46; 250/555, 566, 568, 669; 360/2; 340/146.3 F

[56] References Cited

U.S. PATENT DOCUMENTS

| | | |
|---|---|---|
| 3,780,271 | 12/1973 | Sharkitt et al. ............ 235/61.11 E |
| 3,902,049 | 8/1975 | Hanchett, Jr. ............ 235/61.11 E |
| 3,918,028 | 11/1975 | Humphrey et al. ......... 235/61.11 E |

Primary Examiner—Daryl W. Cook
Attorney, Agent, or Firm—Christensen, O'Connor, Garrison & Havelka

[57] ABSTRACT

An apparatus and method for reading punched cards having data columns parallel to one edge of the card with each data column containing a coded pattern of punches wherein the card is moved past an aligned array of sensors that are mounted to be in alignment with each data column of the passing card. The invention provides for synchronously supplying a parallel digital signal that accurately represents the characters encoded in each data column even though the aligned sensor array is not maintained in precise alignment with the passing data columns and/or the card is not moved past the array at a uniform rate. The synchronous reading is accomplished by sequentially performing two detection sequences to detect two conditions that occur as the card and encoded data columns move by the sensors. The first detection sequence constitutes a determination that at least one unpunched card region has passed by each sensor since the start of the first detection sequence. In effect, the first detection sequence detects the passage of an unpunched region separating adjacent data columns even though the moving data column and sensor array are misaligned with one another to the extent that various sensors are exposed to a punched data location at each moment of time. The second detection sequence is automatically initiated following the first detection sequence and constitutes a determination that one data punch has completely passed by a sensor to effectively determine that an encoded data column is just then moving beyond the sensor array. The sensor signals immediately prior to the detection of this condition constitute, and are supplied as, a digital signal representing the character encoded in the passing data column. Since the first and second detection sequences are sequentially performed in accordance with the pattern of punches in the encoded data columns, synchronous card reading is effected to read each character encoded on the card.

15 Claims, 9 Drawing Figures

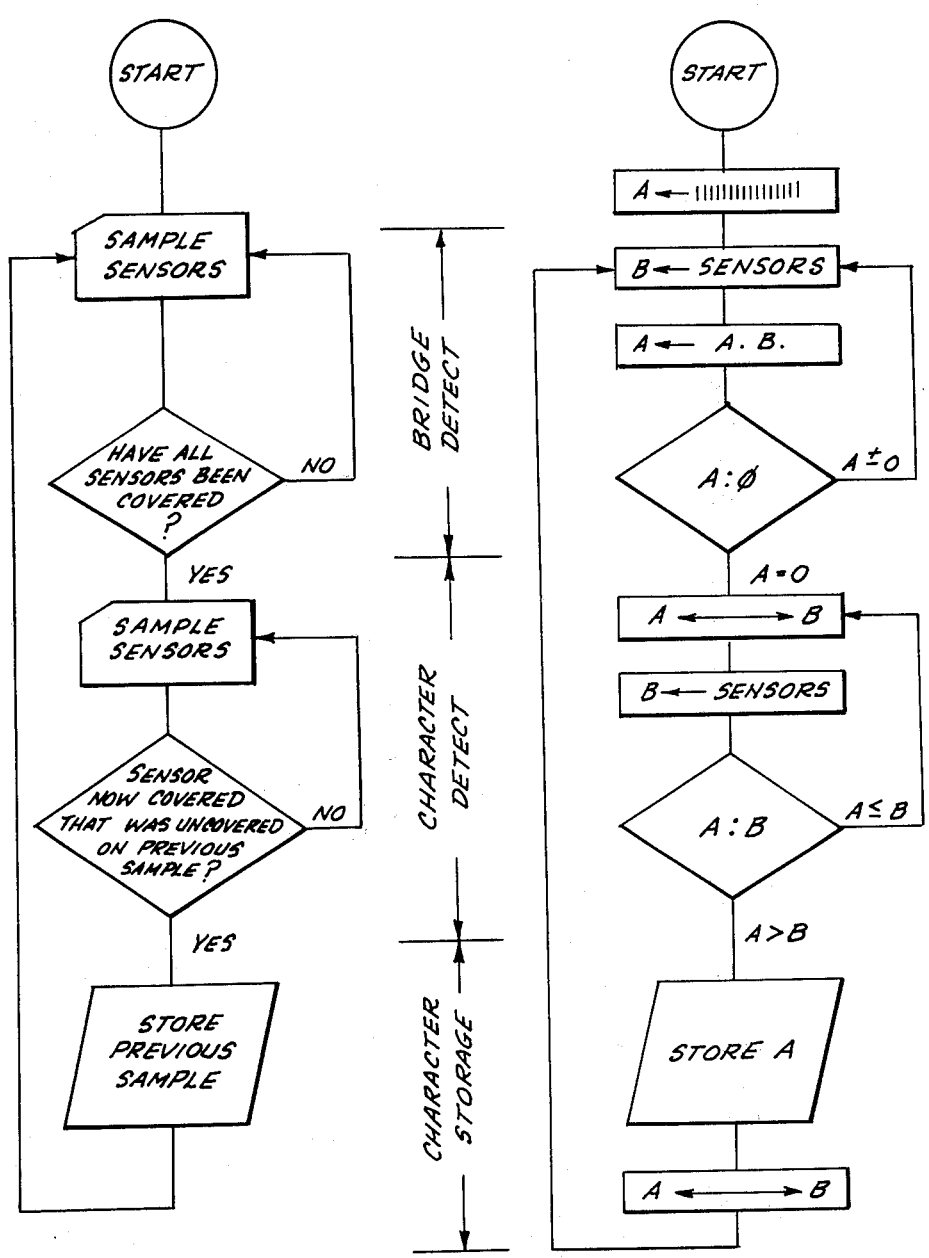

APPARATUS AND METHOD FOR THE SYNCHRONOUS READING OF DATA FROM A PUNCHED CARD

BACKGROUND OF THE INVENTION

This invention relates to the reading of punched data from record forms. More particularly, this invention relates to apparatus and methods for the synchronous, dynamic reading of punched data cards.

The use of punches or perforations in a record form to record or store information is well known. In one widely practiced system of recording punched data, each character of information is recorded as one or more punches occupying various data locations within a columnar region of the record form. One example of such a recording system is known as the Hollerith code wherein 12 data locations are arranged in a column that extends transverse to the longitudinal dimension of the card. The data locations of a data column are punched with one or more punches to represent each digit zero to nine, each letter of the alphabet, and a number of special characters. In order to record as much information as possible on any given card size, record forms utilizing data recorded as punched columnar regions, whether utilizing the Hollerith code or other encoding techniques, generally include a number of closely spaced data columns. For example, standard tabulation cards measuring approximately 7 inches by 3 inches include 80 data columns each having 12 data locations are often used.

One type of apparatus for reading the characters on the card encoded and supplying an electrical signal representative of the encoded information is generally known as a dynamic card reader. A dynamic card reader includes an aligned array of punch sensors spaced to correspond to the spacing between the data locations within a data column. To sequentially read the character encoded in each of the successive data columns, the card is moved relative to the aligned sensors such that each passing data column is substantially in alignment with the aligned array of punch sensors. As each data column passes by the aligned array of sensors, the sensors detect the punched data locations to supply signals representing the character encoded in that data column. For example in the dynamic reading of information from the previously mentioned standard tabulation card wherein the card is encoded in Hollerith format, the card is moved past an aligned array of 12 punch sensors that are positioned to be in alignment with each of the passing data columns. As a particular data column passes the sensors, each sensor supplies a signal that indicates whether an associated data location contains a punch. Thus, it can be recognized that, in effect, the sensor array is intended to supply a 12-bit digital signal encoded in the same manner as the passing data column with the sensors sequentially supplying such a data signal as successive data columns pass by the sensor array.

A variety of punch sensors have been utilized in prior art dynamic card reading apparatus. For example, in early dynamic card readers, the punch sensors were often mechanical switch arrangements wherein electrical contact was made each time a punch passed by a sensor. In more modern dynamic card readers, optical reading means are often employed wherein one planar surface of the card is illuminated by a source of light energy and an array of optical detectors is mounted in an aligned orientation so as to be in juxtaposition with the other planar surface of the card as the card moves through the optical reading means. As the card moves past the optical array, a data punch allows light energy to be coupled to an appropriate sensor and electrical signals representing each punched data location are supplied as each data column passes by the sensor array.

Regardless of the configuration of the punch sensors, one difficulty with prior art dynamic card readers has been that the data columns on the card and the aligned sensors must be maintained in rather precise alignment with one another to prevent the generation of erroneous signals. Since the card must be moved relative to the sensor array, and since the data columns are often closely spaced to one another, prior art card readers have often been structurally complex and have often comprised a number of precision parts in order to maintain satisfactory alignment between the sensor array and the data columns.

Even though a particular dynamic card reader may maintain the card aligned such that each punched data location arrives at the associated punch sensor while all other data locations in that column are passing by the associated punch sensors, a problem can still exist in that even the slightest misorientation or skew between the column being read and the detector array will prevent the sensor signals from occurring simultaneously. That is, assume that a particular data column includes a first data punch in the uppermost data location and a second data punch in the lowermost data location and further that the column passes by the sensor array skewed such that the leading edge of the uppermost data punch reaches the sensor array prior to the arrival of the leading edge of the lowermost data punch. In this situation, the electrical signal produced by the uppermost data punch occurs at a time prior to the time at which the signal is produced by the lowermost data punch. Thus, although the time duration of the two punch-indicating signals can be such that there exists moments in time in which both signals are present, the two signals are not truly simultaneous with one another (i.e., the signals are not in phase with one another).

The failure of the signals to be in phase with one another is often undesirable or completely incompatible with conventional utilization devices which require input information recorded on punched cards. For example, if the output signals of 12 optical sensors are to be utilized as a 12 bit parallel data word and the card is misaligned relative to the sensor array, the signals representing each bit location are not provided in phase with one another, or even provided with a constant phase relationship between the signals. Thus, the loading of the data, for example, into a digital latch circuit or a register of the utilization device becomes extremely difficult or impossible. This difficulty occurs since, in effect, the utilization device has no means of determining at which instant of time a valid signal is present.

Another difficulty with prior art dynamic card readers has been obtaining a suitable output signal that validly represents the characters encoded in the card columns when the card does not move by the sensor array at a uniform rate. In particular when a card passes by a sensor array at a non-uniform rate, the pulse width of the signal supplied by a sensor in response to a punched data location and the time duration between signal pulses supplied in response to two or more card columns having a punch in the same data location varies with changes in the rate at which the card moves. Accordingly, movement of a card through a dynamic card reader at a nonuniform rate effectively causes perturbations in the sensor output signals that hamper validly interrupting the encoded character represented by these signals. It will be recognized that this problem is especially acute in manually operated dynamic card readers wherein an operator pulls or pushes the card past the sensor array, since in many prior art dynamic readers the operator can not only move the card at a nonuniform rate, but may stop and start the card several times before the encoded data columns each pass by the sensor array. Further, it will be recognized that the signal disturbances caused by improper alignment of the card and sensor array, and the signal disturbances caused by movement of the card at a non-uniform rate, are collective in that the effects of both conditions combine to detrimentally effect the signals supplied by the sensor array.

Accordingly, it is an object of this invention to provide an apparatus and method for the dynamic reading of punched cards that is compatible with all conventional apparatus utilizing the information recorded on such cards.

It is another object of this invention to provide an apparatus and method wherein the punched data recorded on a card is read in a synchronous manner to supply a digital signal suitable for use by conventional digital processing equipment.

It is yet another object of this invention to provide a dynamic card reading apparatus and method for synchronously reading data recorded in columnar format on a card that is suitable for use in situations in which the data columns are not necessarily maintained in perfect alignment with an array of punched detecting devices.

It is still another object of this invention to provide a dynamic card reading apparatus and method for synchronously reading punched cards in situations in which the punched cards are not necessarily moved past the punch sensor array with a uniform velocity.

SUMMARY OF THE INVENTION

These and other objects are achieved in accordance with this invention by sequencing between two detection modes to sequentially detect two conditions that occur as a card having encoded data columns, substantially perpendicular to the longitudinal edges of the card, is moved past an aligned array of sensors arranged to be in substantial alignment with each passing data column. In the first detection mode, the output signal supplied by each sensor of the sensor array is sampled or monitored to determine if an unencoded card region has reached each sensor at least once following the initiation of the first detection mode. Once this condition is detected, the second detection mode is initiated. During the second detection mode, the output signals of each sensor of the sensor array are again sampled or monitored to determine the time at which a first one of the sensors is exposed to an unencoded card region after first being exposed to an encoded card region. As shall be described in detail hereinafter, when the two conditions have been sequentially detected, the signals supplied by the sensors at an instant of time just prior to the completion of the second detection mode validly represents the character encoded in the data column presently passing by the sensors. When such a valid character signal is obtained, the first detection mode is automatically initiated to enable the reading of the next encoded data column to reach the sensor array.

For ease of description, and to enhance the understanding of this invention, the first detection mode wherein it is determined that an unencoded card region has reached each sensor at least once during the first detection mode is hereinafter denoted as "bridge detection." In addition, the second detection mode wherein it is determined that one of the sensors has first been exposed to a coded region of the card and then exposed to an unencoded card region is herein denoted as "character detection." Accordingly, it can be recognized that in accordance with this invention, bridge detection and character detection are sequentially performed in synchronization with the information encoded on the card to read the character encoded in each encoded data column of a card passing by an aligned array of sensors.

In accordance with this invention, bridge detection does not require that each sensor simultaneously supply a signal indicating that an unencoded data location is presently moving past the sensor. Thus, if a card is moving past the sensor array with a skewed orientation such that some of the sensors are first exposed to an unencoded card region and then exposed to an encoded card region before the last one of the remaining sensors is exposed to an unencoded card region, bridge detection still occurs when the last of the sensors is exposed to an unencoded card region. Stated in another manner, bridge detection, as practiced in this invention requires only that an opaque card region has reached each sensor since the last character detection.

In a similar manner in accordance with this invention, character detection does not require that each encoded region of a particular data column simultaneously reach the associated sensor. In effect, character detection as defined herein determines the instant in time at which the first encoded region of a particular data column has passed completely by the associated sensor. Accordingly, the sensor signals supplied just prior to the character detection effectively comprise a digital word that validly represents the information encoded in the passing data column. Since bridge detection and character detection are both insensitive to misalignment between the sensor array and the passing data columns, and since bridge detection and character detection are sequentially performed in accordance with the pattern of encoded regions, the information characters contained in the successive data columns are sequentially and synchronously read as the card is moved past the sensor array.

Each disclosed embodiment of this invention is arranged for reading cards wherein each information character is encoded as one or more punches or perforations in a data column that is substantially perpendicular to the longitudinal edges of the card. To sense the punched data locations, an array of optical sensors is mounted in alignment along one wall of a card passage that is dimensioned for the movement of a punched card with the data columns moving substantially parallel to the aligned sensor array. In this arrangement, the optical sensors are spaced so that each data location within a data column will pass by an optical sensor. Each optical sensor provides an electrical signal representative of whether a punched data location or an opaque card region is presently passing by the sensor. As will be recognized upon understanding the invention, this invention can be practiced in situations in which the data columns are encoded by techniques other than punches or perforations. For example, when suitable sensors are employed, the invention can be used in reading information coded as magnetic regions or encoded as regions of a card of a color that contrasts with the color of the card.

In one disclosed embodiment of the invention, the electrical output of each sensor is coupled to an associated bridge detector circuit and an associated character detector circuit. The output terminals of each bridge detector circuit are commonly connected to one another to supply a signal indicating that bridge detection has occurred. In a similar manner, the output terminals of each character detector circuit are commonly connected to one another to supply a signal indicating that character detection has occurred.

In this embodiment, each bridge detector circuit and each character detector circuit operate under the control of a control circuit which enables each type of detector circuit as the other type of detector circuit completes its detection sequence. That is, when the bridge detector circuits complete the bridge detection sequence, the control circuit enables the character detector circuits to perform the character detection sequence. Conversely, when a character detection sequence is completed, the control circuit enables the bridge detector circuits to perform the bridge detection sequence. Thus, the character detector circuits and the bridge detector circuits are sequentially activated, in accordance with punched data locations contained on a card moving past the sensor array, until the punched card has passed completely by the sensor array. In this embodiment a clock signal is connected to both the control circuit and to each character detector circuit such that the apparatus operates in a synchronous manner.

In another embodiment of the invention, suitable for use in situations wherein a dynamic card reader is utilized in conjunction with a data processor unit, the output signal of each optical sensor is coupled to an addressable signal port or sampling circuit. The sampling circuit is strobed by a sampling pulse that is supplied by the data processor or by another convenient source. The sampling circuit couples digitized signal samples representative of the output signal of each optical sensor to a data bus that is connected to the data processor unit. The data processor includes storage registers for storing the signal supplied by each sensor during a current sampling period and the signal supplied by each sensor during the previous sampling period. In this embodiment, an arithmetic unit contained within the data processor, and controlled by a data processor control unit, logically combines and compares the stored signals to detect the occurrence of a bridge condition and to detect the character detection condition. As in the case of each disclosed embodiment, this embodiment sequentially performs a bridge detection sequence and a character detection sequence in accordance with the pattern of punches encoded on the card to synchronously read each encoded character even though the sensor array and data columns of the moving card are not in precise alignment with one another and/or the card is moved at a nonuniform rate.

BRIEF DESCRIPTION OF THE DRAWING

FIGS. 8 and 9 are flow diagrams useful in understanding the embodiment of this invention depicted in FIG. 7.

DETAILED DESCRIPTION

Figure 1:
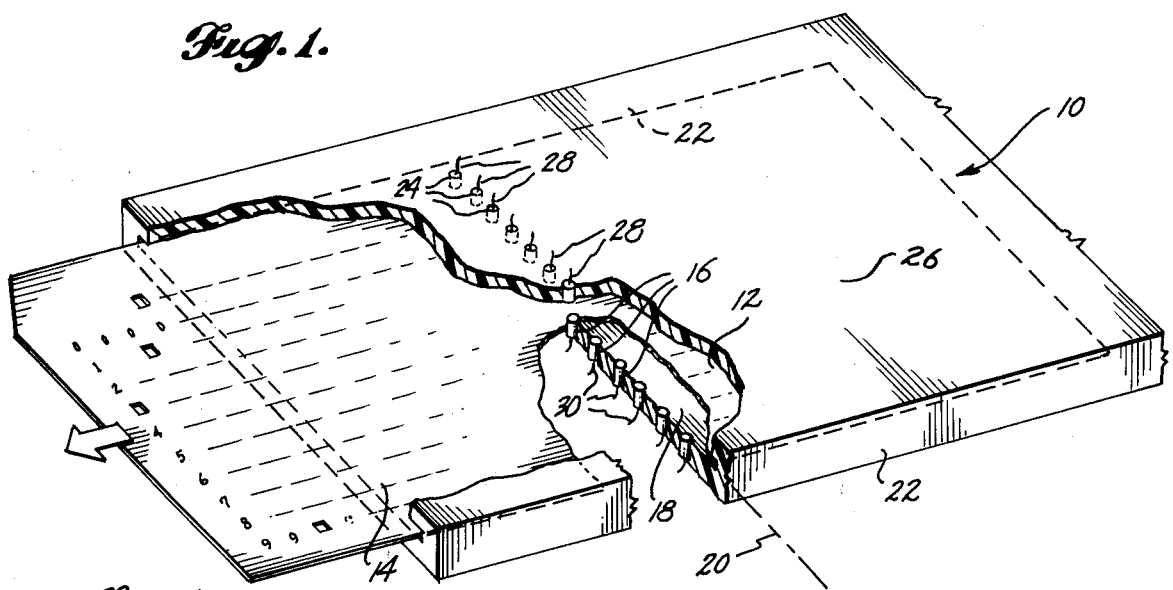
FIG. 1 is a partially cutaway isometric view illustrating a card guide and optical reading arrangement for supplying electrical signals as a punched card is moved through the card guide.

FIG. 1 is a simplified illustration of the basic structure of a dynamic card reader. Such structure typifies a wide variety of the prior art dynamic card readers, and is suitable for use in the practice of this invention. In FIG. 1, a card guide 10 forms a slotted passageway 12 dimensioned for the passage of a punched card 14. The card 14, which includes a number of data columns each having a number of data locations for punch encoding information, is either manually or mechanically moved through the slotted passageway 12.

As the card 14 is moved through the card guide 10, the punched data locations are detected by a plurality of optical sensors 16, such as phototransistors, that are mounted along a wall 18 of the card guide 10. The optical sensors 16 are spaced to correspond to the spacing between data locations with the center of each optical sensor 16 lying on a line 20 that is substantially perpendicular to the edge wall 22 of the card guide 10. In the depicted arrangement, light energy for reading each data punch is supplied by an array of optical sources 24.

The optical sources 24 are mounted in alignment along a card guide wall 26 that is oppositely disposed relative to the wall 18. The optical sources 24 are conventional devices spaced to correspond to the spacing between the data locations within each card column. Further, the optical sources 24 are arranged relative to the optical sensors 16 such that each optical source 24 couples light energy to an associated optical sensor 16 whenever a punched data location passes between the optical source and optical sensor.

In operation, the optical sensors 24 are energized by a suitable source of electrical potential (not shown) that is connected to the optical source electrodes 28. Each output electrode 30 of an optical sensor 16 is connected to an electrical circuit, or other utilization device. As the card 14 is moved through the slotted card passage 12, each data column passes between the aligned optical sources 24 and the aligned optical sensors 16. Whenever a punched data location passes between a source 24 and a sensor 16 that is associated with that particular data location, light energy is coupled to the optical sensor 16 and the sensor supplies an electrical signal at the sensor electrode 30. For example, the card 14 depicted in FIG. 1 is a standard tabulation card having 80 data columns with 12 data locations in each data column. In such a tabulation card, a data punch placed in the lower data locations of a column are ordered and identified as the "0-9 punches" with punches in the two uppermost data locations (generally known as "zone" punches) being commonly identified as an "11" punch and a "12" punch. Thus, in the situation depicted in FIG. 1, a tabulation card having a 3 punch in the first data column, an empty or unpunched second data column, a 12 and a 1 punch in the third data column, and an 11 and 9 punch in the fourth data column is being moved through the card guide 10.

If the card 14 were moved through the card guide 10 with each data column passing in precise alignment with the aligned sensors, and the card 14 moved at a uniform rate, the sensor 16 associated with the 3 punch in the first data column would supply a pulse of electrical energy when the first column passed the sensor array, the sensors associated with the 12 and 1 punch in the third data column would simultaneously supply a pulse of electrical energy at a predetermined time after the reading of the first data column, and the sensors associated with the 11 and 9 punch in the fourth data column would simultaneously supply an electrical pulse at a predetermined time after the reading of the third data column. Thus, ideally, a card reader utilizing the arrangement of FIG. 1 provides synchronous data reading in that the electrical signals supplied by two or more data punches in the same data column are in time coincidence and are produced in synchronization with the movement of the data column past the sensors.

Figure 2:
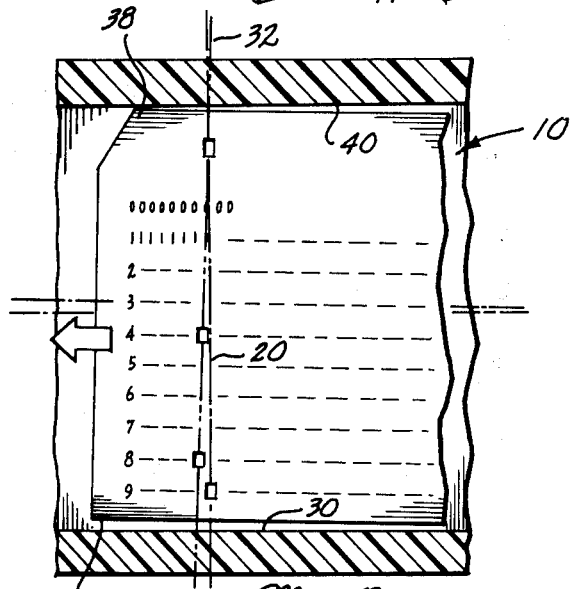
FIG. 2 is a cross-sectional plan view of the card guide depicted in FIG. 1 that illustrates misalignment between the optical reading arrangement and the encoded data columns of a card moving through the card guide.

Since the data columns of conventional punched cards are generally spaced together as close as possible in order to maximize the amount of information that can be recorded on a card, the alignment of the card 14 with the optical sensors 16 has heretofore been an especially critical factor. In practice, due to manufacturing tolerances and wear relative to both the card guide 10 and the card 14, such precise alignment of the card with the optical reading array has not been achieved. Thus synchronous reading of the data contained on such a card has been extremely difficult or impossible. For example, referring to FIG. 2, it can be seen that a card 14 need not be misaligned or skewed by a large amount before data punches in one data column can be mistakenly detected as being in another data column. In FIG. 2, the card 14 is skewed such that the data locations in the lower portion of a data column (e.g., a 9 punch) will reach the sensor array prior to the data locations in the upper portion of the same data column, (e.g., a 12 punch). As previously noted, such skew arises for a number of reasons, such as manufacturing tolerances and wear with respect to both the card guide 10 and the card 14.

Figure 3:
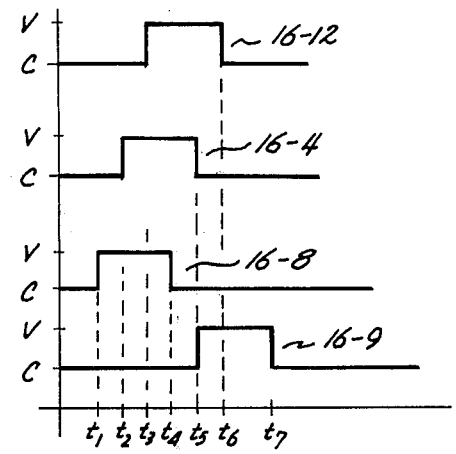
FIG. 3 graphically illustrates the effect of the card misalignment depicted in FIG. 2 on the electrical signals supplied by the optical reading arrangement as the card passes through the card guide.

In the particular situation depicted in FIG. 2, a data column denoted by the line 32 includes a 12 punch, a 4 punch and an 8 punch with the nextmost data column including only a 9 punch. As the card 14 is moved past the sensor array (denoted by the line 20) the optical sensors supply the electrical signals depicted in FIG. 3. As shown in FIG. 3, the 8 punch first causes the associated sensor 16-8 to supply an electrical signal at time $t1$. An electrical signal is then generated at time $t2$ by the sensor 16-4 that is associated with the data location containing a 4 punch. In a like manner, a signal is supplied at time $t3$ by the optical sensor 16-12 that is positioned to sense the 12 punch. When the card is skewed to the degree depicted in FIG. 2, the signal developed by the 12 punch in the column along line 32 has not been terminated prior to the time $t5$ at which the 9 punch in the next data column reaches the sensor that is positioned for detecting 9 punches. Hence, as shown in FIG. 3, the skew angle between the card and optical sensors causes the electrical signals to be supplied without synchronization to the card reading process. Thus when viewed relative to time, the signals are phase shifted relative to one another with a portion of a signal representing a punch in one column being in time coincidence with a portion of a signal representing a punch in the next data column. Thus interpreting the sensor signals to determine the punched information has heretofore been extremely difficult or impossible. That is, if the electrical signals of FIG. 3 are viewed in the time interval $t1$ to $t2$, it appears that only an 8 punch is present; if the signals are viewed in the time interval $t2$ to $t3$, it appears that a 4 punch and an 8 punch are present; if viewed in the period $t3$ to $t4$ it appears that a 4 punch, an 8 punch and a 12 punch are present; if viewed in the period $t4$ to $t5$ it appears that the 4 and 12 punch are present; if viewed in the period $t5$ to $t6$ it appears that a 9 and 12 punch is present; finally if viewed in the time interval $t6$ to $t7$ it appears that only a 9 punch is present. Thus one of the problems in prior art card readers is determining at which instant of time the electrical signals supplied by the optical sensors validly indicate the punched data contained on the card. For example, in the situation depicted in FIGS. 2 and 3, valid data is present in the intervals $t3$ to $t4$ to indicate the column along the line 32 and valid data is present after time $t6$ to indicate the next data column containing the 9 punch. As shall be described hereinafter, this invention is configured to read the data from such a skewed card by detecting a moment in time at which a valid data signal is available and making that signal available as a digital signal compatible with virtually all digital utilization devices.

It will be recognized by those skilled in the art that many prior art card readers are capable of maintaining a punched card with less skew than that depicted in FIG. 2. It will, however also be recognized by those skilled in the art that prior art limitations other than skew heretofore have also complicated the reading of punched cards with a dynamic card reader.

First, the skew angle, no matter how slight, does not necessarily remain constant as the card 14 is moved along the card guide 10. That is, the orientation between the data columns e.g., line 32 in FIG. 2 an the aligned optical sensors 16 may be constantly changing as a single card is read. For example, with reference to FIG. 2, as a card 14 is read, the card may be first skewed slightly upward (relative to the orientation depicted in FIG. 2), such that the lower corner 34 of the card 14 is not immediately adjacent to the lower edge wall 30 of the card guide 10. Then as the card 14 is moved along, the card may pass through an aligned position and become skewed such that the upper card corner 38 is not immediately adjacent to the upper edge wall 40 of the card guide 10. This movement between two oppositely skewed orientations can occur several times over the duration of the card travel. Hence, rather complex perturbations can occur in the signals supplied by the optical sensor 16 as the various encoded data columns pass by.

Secondly, it can be easily recognized that the wave shape of the signal supplied by each optical sensor 16 (i.e., pulse duration and time between pulses) is not only dependent on the geometry of the card and the punches therein, but is a function of the speed at which the card 14 is moved through the card guide 10. Thus, variations in the speed of the card travel also determine the electrical output signal supplied by each optical sensor 16. As shall be described in detail hereinafter, in accordance with this invention, the card 14 can travel at a nonuniform velocity or even stop and start again as the card 14 is moved through the card guide 10. Accordingly, this invention is suitable for use in applications in which the card is conveyed by mechanical means such as a motor drive unit or conveyed by manual movement.

Figure 4:
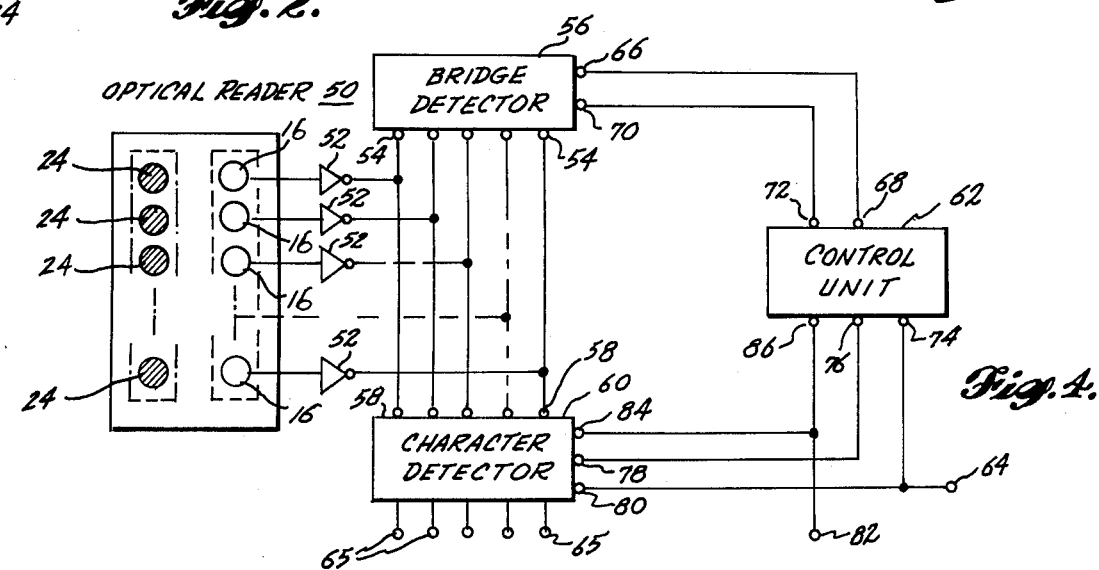
FIG. 4 is a block diagram of a card reading system in accordance with this invention.

FIG. 4 depicts, in block diagram form, a basic embodiment of this invention. In FIG. 4, an optical reading arrangement such as that depicted in FIG. 1, having an aligned array of optical sources 24 and an aligned array of optical sensors 16, is denoted within the outline 50. Each optical sensor 16 is connected to an input terminal of a conventional signal shaping network 52, such as a Schmitt trigger circuit. Such conventional signal shaping networks convert the signal supplied by each optical sensor 16 to a rectangular pulse that is compatible with digital circuit techniques. The output terminal of each signal shaping network 52 is connected to one input terminal 54 of a bridge detector 56 and is also connected to one input terminal 58 of a character detector 60.

The bridge detector 56 and the character detector 60 are each sequentially activated by a control unit 62 as a function of the signals coupled to the bridge detector 56 and to the character detector 60 from the optical sensors 16. Additionally, the operation of the control unit 62 and the operation of the character detector 60 are each controlled by a periodic clock signal applied to clock pulse terminal 64 such that overall circuit operation is a synchronous digital process.

The bridge detector 56 is enabled by a signal applied to a terminal 66 of the bridge detector by the control unit 62. The bridge detector 56 is enabled by the control unit 62 when a punched card begins to pass through the card reading apparatus, (e.g., the card 14 is placed in the card guide 10 of FIG. 1), and is also enabled each time the character detector 60 has determined that a valid digital output signal is available at a plurality of output terminals 65. As shall be described, the electrical signals at the output terminals 65 at the conclusion of the character detector sequence constitutes a parallel digital word representative of the character encoded in that data column most recently passing by the optical sensors 16.

When the bridge detector 56 is enabled by the control unit 62, the bridge detector determines the time at which at least one opaque card region has reached each optical sensor 16 (after the application of the enabling signal). Hence, in effect, the bridge detector 56 senses the passage of the opaque region of the card that separates two adjacent punched data columns. In respect to the operation of the bridge detector 56, it is important to realize that it is not necessary for an opaque card region to be simultaneously passing by each optical sensor 16. That is, as the bridge detector 56 is enabled, the detector senses each opaque region reaching an optical sensor 16. Should a punched data location reach a sensor 16 after it has been "covered" by an opaque region, but prior to the time at which an opaque card region has reached each optical sensor 16, the punched location has no effect on the operation of the bridge detector 56. Thus in essence, each opaque card region that reaches an optical sensor 16 during the time period in which the bridge detector 56 is enabled provides a "set signal" associated with that particular optical sensor. Once such a set signal has been supplied for each of the optical sensors 16, bridge detection occurs.

Upon the detection of the bridge condition, the bridge detector 56 couples a signal from an output terminal 70 to an input terminal 72 of the control unit 62. In response to this signal, and in synchronization with the next clock pulse arriving at a control unit clock terminal 74, the control unit 62 switches the level of the enabling signal supplied to the bridge detector terminal 66 to disable the bridge detector 56. At the same time, the control unit 62 enables the character detector 60 by supplying a signal from a control unit terminal 76 to a terminal 78 of the character detector 60.

The character detector 60 includes storage means, such as a shift register, for storing digital signals representative of the signal supplied by each optical sensor 16 via the signal shaping networks 52. The storage means are strobed by the clock pulses applied to the clock pulse terminal 64 and coupled to the character detector clock terminal 80. For example, if an opaque card region blocks light energy from reaching an optical sensor 16, a digital 0 is stored and, if a punched data location is passing by the optical sensor 16 a digital 1 is stored. To simplify terminology hereinafter, when an opaque card region blocks light energy, from reaching an optical sensor that optical sensor will be referred to as being "covered." In a similar manner, when a punched data location allows light energy to reach a particular optical sensor 16, that sensor will be referred to as being "uncovered."

The clock pulse is applied to the character detector 60 to establish signal samples representative of the output signal of each optical sensor 16. In particular, at all times at which the character detector 60 is enabled, the storage means of the character detector 60 stores signals representative of the covered or uncovered state of each optical sensor 16 at the time a particular clock pulse is applied and simultaneously stores signals representative of the covered or uncovered state of each optical sensor 16 at the time at which the previous or nextmost antecedent clock pulse was applied. Thus effectively, the character detector 60 includes a two word memory wherein each stored digital word represents the covered or uncovered state or each optical sensor 16 at two sequential sampling times. Since the clock pulse supplied to terminal 64 is periodic, the memory is continuously updated to contain signals representing the optical sensor output signals at each particular sample time and at each nextmost antecedent sample time.

The character detector 60 also includes logic means for determining the first optical sensor 16 to change from an uncovered to a covered state. For example, if a logical 0 represents a covered state and a logical 1 represents an uncovered state, then as each clock pulse arrives, the character detector 60 compares each optical sensor signal stored in response to that clock pulse with the corresponding optical sensor signal stored in response to the previous clock pulse to detect a transition from a logical 1 to a logical 0. When the first optical sensor 16 goes from the uncovered state to the covered state, each punched data location in the data column then passing by the optical sensor 16 has reached the optical sensor array and one of the punched locations has just passed by the sensor array. Thus, at this time, the digital word stored in response to the nextmost antecedent clock pulse represents the information recorded in the punched data column presently passing by the optical sensor 16.

When the first uncovered-covered transition is detected by the character detector 60, a signal is coupled from a terminal 84 of the character detector 60 to a terminal 86 of the control unit 62. Additionally, this signal is made available at a terminal 82 to indicate that a digital word representative of a punched data column is available at the output terminals 65.

The application of the signal at terminal 86 of the control unit 62 signifies that the character detection sequence is complete. Thus, coincident with the next clock pulse applied to the terminal 74, the control unit 62 supplies an enabling signal to the terminal 66 of the bridge detector 56. Simultaneously, the control circuit 62 switches the level of the enabling signal supplied to the character detector 60 to disable the character detector until again enabled by the control unit 62. Operation continues in the above described manner, alternately cycling between bridge detection and character detection until the card passes completely by the optical sensor 16.

Referring to FIGS. 2 and 3, the effectiveness of the embodiment depicted in FIG. 4 to read punched data from a card 14 moving with a skewed orientation relative to the aligned optical sensors 16 can be readily ascertained. First, in the situation of FIG. 2, since the optical sensors 16 associated with the data locations for 4, 8, 9 and 12 punches have been covered prior to the time $t1$ in FIG. 3, the bridge detector 56 will have detected a bridge condition prior to time $t1$. Thus, before the first punched location reaches the optical sensors 16, control unit 62 will have disabled the bridge detector 56 and enabled the character detector 60.

In the practice of the invention, clock pulses (not shown in FIG. 3) are coupled to the clock terminal 80 of the character detector 60 at a frequency considerably higher than the frequency at which punched data locations can move past the optical sensors 16. Thus, in effect, the signal supplied by the optical sensors 16 is sampled by character detector 60 many times during each covered and uncovered interval. As the card 14 of FIG. 2 travels through the card guide 10 to supply the signals depicted in FIG. 3, the character detector 60 detects the uncovering of the optical sensor 16-8 upon the next clock pulse following time $t1$. With each subsequent clock pulse between times $t1$ and $t4$, the storage means of the detector 60 stores a logic signal to represent the uncovered state of sensor 16-8 at that time, and also stores a logic signal to represent the uncovered state of the optical sensor 16-8 at the nextmost antecedent clock pulse. At time $t2$, the optical sensor 16-4 is uncovered and, accordingly, each subsequent clock pulse causes logic signals representing the uncovered state to be stored in those character detector storage locations representing the signal supplied by the optical sensor 16-4 at each clock pulse and at each nextmost antecedent clock pulse. Likewise, at time $t3$ the optical sensor 16-12 is uncovered and each subsequent clock pulse loads logic signals representing the uncovered state into the two appropriate storage locations. Thus, at the occurrence of each clock pulse subsequent to time $t3$ and before time $t4$, both storage locations that are associated with the optical sensors 16-8, 16-4, and 16-12 contain logic signals indicating that each of these sensors is uncovered. Since all other optical sensors 16 are covered, both storage locations associated with all other optical sensors 16 contain a logic signal indicating the covered state. Now upon the next clock pulse following the time $t4$, the character detector 60 compares the two stored signals associated with the optical sensor 16-8 and determines that the optical sensor 16-8 has made a transition between the uncovered and covered states. Hence, as previously described, the character detector 60 couples the logic signals stored to represent the sensed 8, 4 and 12 punches, to the output terminals 65 as a valid output signal and simultaneously signals the control unit 62 that the character detection sequence is complete. In turn, and coincident with next clock pulse at terminal 64, the control unit 62 disables the character detector 60 and enables the bridge detector 56.

Examining FIG. 3, in view of the previously described operation of the bridge detector 56, it can be noted that the bridge detector 56 will detect that optical sources 16-9, 16-8 and 16-4 are each covered (along with all other optical sensors 16 that are not included in FIGS. 2 and 3), as soon as the bridge detector 56 is enabled by the control unit 62 (i.e., slightly after time $t4$ in FIG. 3). As previously described, although the optical sensor associated with the data location containing 9 punches makes a covered to uncovered transition at time $t5$, (which is prior to the completion of the bridge detection sequence), there is no effect on the operation of the bridge detector 56. Thus, at time $t6$, when an opaque card region reaches and covers the optical sensor 16-12 the bridge detector 56 senses that each optical sensor 16 has been covered at least once since commencing the bridge detection sequence. Accordingly, as previously described, the bridge detector 56 signals the control unit 62 that bridge detection has occurred. Coincident with the next clock pulse, the control unit 62 disables the bridge detector 56 and enables the character detector 60 for reading the next punched data column to reach the array of optical sensors 16.

In respect to the situation presented in FIGS. 2 and 3, each clock pulse subsequent to the enabling of the character detector 60 causes a logic signal representing the uncovered state of optical sensor 16-9 to be stored in both character detector storage locations associated with the sensor 16-9 until the arrival of the first clock pulse following time $t7$ of FIG. 3. With the arrival of the first clock pulse following time $t7$, the character detector 60 determines that the optical sensor 16-9 has made a transition from the uncovered to covered state and accordingly supplies a signal to the output terminals 65 indicating that a 9 punch was contained in the next data column. The control unit 62 then causes the card reading system to revert to the bridge detection mode to continue reading any punched data columns that may reach the optical sensor 16 following the data column containing the 9 punch.

Figure 5:
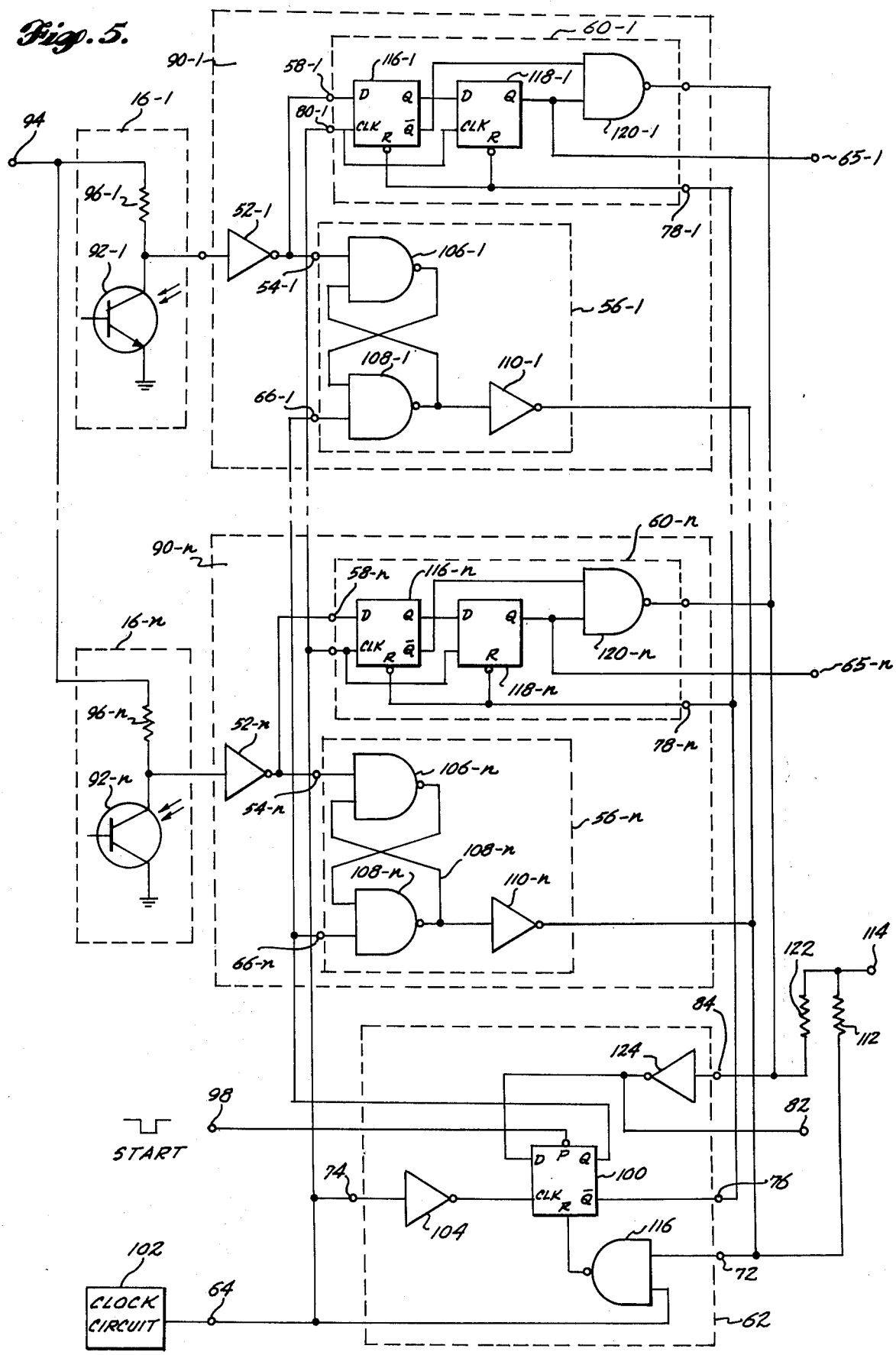
FIG. 5 is a simplified schematic diagram of one embodiment of the invention that corresponds to the block diagram of FIG. 4.

FIG. 5 schematically depicts one embodiment of the card reading system of this invention depicted in FIG. 4. In the embodiment of FIG. 5, the bridge detector 56 and the character detector 60 each respectively comprise a plurality of identical circuits with one such bridge detection circuit and one such character detection circuit being coupled to each optical sensor 16. More particularly, FIG. 5 depicts two optical sensors 16-1 and 16-n respectively coupled to two punch reading detectors 90-1 and 90-n. Each of the punch reading detectors 90-1 and 90-n respectively include a bridge detector circuit 56-1 and 56-n and a character detector circuit 60-1 and 60-n. It will be understood that although FIG. 5 depicts only two optical sensors 16 and two associated punch reading circuits 90, that an embodiment of this invention will include an optical sensor 16 and a punched reading circuit 90 for each data location within the data columns of the card to be read. For example, in reading punched data cards that are encoded with the previously described Hollerith code, 12 sensors and 12 punch reading circuits will be employed.

Regardless of the number of optical sensors and punch reading circuits utilized, each bridge detector circuit 56-$i$, $i = 1,n$ and each character detector circuit 60-$i$, $i = 1,n$, operates under the control of a control unit 62. The control unit 62 sequentially first activates the bridge detector circuits 56-$i$ and then activates the character detector circuits 60-$i$ in accordance with the punched information contained on a card passing by the optical sensors 16.

In FIG. 5, each optical detector 16-$i$ is a phototransistor 92 having the emitter electrode thereof connected to the circuit common or ground potential and the collector electrode connected to a bias terminal 94 via a resistor 96-$i$. The junction between the phototransistor collector electrode and the associated resistor 96-$i$ is connected to the input terminal of a signal shaping network 52-$i$ included in each punch reading circuit 90-$i$. The phototransistors 92 are biased and arranged such that a collector to emitter current is established as each punched data location moves by the associated phototransistor (i.e., the phototransistor is uncovered). The collector to emitter current caused by each punched data location, in turn, causes the potential at the input terminal of the associated wave shaping network 52 to decrease from a potential near the potential applied to the bias terminal 94 to a potential near that of the circuit common potential. When this occurs, the associated signal shaping circuit 52 converts the time-varying signal caused by the passage of a punched data location to a rectangular pulse signal. In particular, the signal supplied by each signal shaping circuit 52 is a first predetermined level when the associated optical sensor 16 is uncovered (the punch is passing by) and a second predetermined, lower level when the associated optical sensor 16 is covered (an opaque card region is passing by). In accordance with this invention, these levels are respectively utilized as a logical 1 and a logical 0, with the signal being supplied by each signal shaping network 52-$i$ being supplied to an input terminal 54-$i$ of an associated bridge detector circuit 56-$i$ and also being supplied to an input terminal 58-$i$ of an associated character detector circuit 60-$i$. Each signal shaping circuit 52-$i$ is a conventional circuit such as the well known Schmitt trigger circuit, arranged to provide the described operation.

When a punched card is introduced into the card guide in which the optical sensors 16 are mounted, e.g., card guide 10 of FIG. 1, a start pulse is applied to terminal 98 of the control circuit 62 to initialize system operation. The start pulse is a single rectangular electrical pulse that can be supplied at any time prior to the time at which the first punched data location reaches the optical sensors 16. Such a pulse can be supplied, for example, by a switch activated by the system operator, a switch automatically activated by the passage of the card through the reading mechanism, or can be supplied by an electronic circuit. A pulse can be supplied by an electronic circuit, for example, by logically combining the output signals of each optical sensor 16 or each signal shaping network 52 to determine the first time at which all the optical sensors 16 make a transition from the uncovered to covered state to thereby detect that the leading edge of a card has reached the optical sensors 16.

Regardless of how the start pulse is derived, the pulse is applied to the preset terminal of a type D flip-flop circuit 100 contained within the control circuit 62. The flip-flop 100 is clocked by a clock signal generated by a conventional clock circuit 102, having a frequency considerably higher than the maximum rate at which punched data locations can pass by optical sensor 16. As shown in FIG. 5, the signal from the clock circuit 102 is applied to a clock terminal 74 of the control circuit 62 and is coupled to the clock terminal of the flip-flop 100 via a conventional inverter circuit 104. Thus, it will be recognized that the flip-flop 100 will be set in synchronization with the next clock pulse applied to the controller clock terminal 74 after the application of the start pulse.

When the flip-flop 100 is set in this manner, the flip-flop Q output goes to the logical 1 state and the flip-flop Q̄ output goes to the logical 0 state. The Q and Q̄ outputs of the flip-flop 100 are respectively connected to the control circuit terminals 68 and 76 to respectively supply the signal for enabling each bridge detector 56-$i$ and each character detector 60-$i$. As shall be described hereinafter, the transition of the character detector enabling signal to a logical 0 state initializes each character detector circuit 60-$i$ for the next character detection sequence and also effectively disables each character detector circuit until the character detection sequence is again initiated by the control circuit 62.

Referring now to the bridge detector circuits 56, each bridge detector circuit 56-$i$, $i = 1,n$ includes a set-reset latch comprising two 2-input NAND gates 106-$i$ and 108-$i$. One input terminal of each NAND gate 106-$i$ is connected to the output terminal of an associated signal shaping network 52-$i$ and the second input terminal of each NAND gate 106-$i$ is connected to the output terminal of the associated NAND gate 108-$i$. One input terminal of each NAND gate 108-$i$ is connected to the output terminal of an associated NAND gate 106-$i$ and the second input terminal of each NAND gate 108-$i$ is connected to a terminal 66-$i$ for receiving the bridge detector enabling signal supplied by the control circuit 62. Additionally, the output terminal of each NAND gate 108-$i$ is connected to the input terminal of an inverter circuit 110-$i$.

With this circuit arrangement, when the enabling signal supplied by the control circuit 62 is a logical 1, the signal at the output terminal of each NAND gate 108-$i$ will switch to a logical 0 only when the signal supplied by the associated optical sensor 16-$i$ becomes a logical 0 (i.e., the associated optical sensor 16 is covered). Further, should the signal applied by an optical sensor 16-$i$ become a logical 1 after being a logical 0 (but before the end of the bridge detection sequence) the signal at the output terminal of the NAND gate 108-$i$ will remain set as a logical 0. This "set" feature is achieved since the output state of each NAND gate 108-$i$ is an indeterminate or a "don't care" state when logical 1's are applied to the terminals 54-$i$ and 66-$i$. Hence when the bridge detector enabling signal is a logical 1 (terminal 66-$i$), and the associated optical sensor 16-$i$ is uncovered to supply a logical 1 signal to terminal 54-$i$, the NAND gate 108-$i$ continues to supply a logic signal of the same logic level (i.e., a logical 0) as was supplied prior to the uncovering of the associated optical sensor 16-i.

Thus, when the start pulse is applied to terminal 98 and each bridge detector circuit 56-i is enabled by the control circuit 62, the output signal of each NAND gate 108-i is set at logical zero as soon as the associated optical sensor 16-i is covered. The output signal of each NAND gate 108-i remains set at logical 0 until each bridge detector circuit 56-i is reset by the control circuit 62 causing the bridge detector enabling signal to switch to a logical 0 state. Whenever the bridge detector enabling signal is in the logical 0 state, the output signal of each NAND gate 108-i is a logical 1 regardless of the covered or uncovered state of the sensor 16-i to effectively disable each bridge detector circuit 56-i. Thus, the input signal to each inverter 110-i is a logical 1 unless an opaque card region has reached the associated optical sensor 16-i after the initiation of the bridge detection sequence.

Each inverter circuit 110-i, i = 1,n is a conventional inverter circuit such as a common emitter transistor stage that is arranged to invert the signals supplied by the NAND gates 108-i and to perform a logical AND operation on the inverted signals. Such an arrangement is effected, for example, by utilizing inverter circuits 110 of the so-called "open-collector" variety in which the inverter transitor of each inverter circuit 110 does not include a collector load resistor internal to the inverter circuit 110. Each inverter circuit output terminal is then connected to a single collector load resistor. This arrangement is utilized in the circuit embodiment of FIG. 5, with the output terminal of each inverter 110-i being commonly connected to one terminal of a resistor 112. The second terminal of the resistor 112 is connected to an appropriate bias supply voltage at bias terminal 114.

The junction between the resistor 112 and the commonly connected output terminals of the inverters 110 is connected to terminal 72 of the control circuit 62 to supply a signal indicating the occurrence of bridge detection (i.e., that each optical sensor 16 has been covered at least once since the onset of the bridge detection sequence). As can be seen from the above description of the bridge detector circuits 56, the signal at terminal 72 is a logical 0 until each bridge detector circuit 56-i, i = 1,n has determined that the associated optical sensor 16-i has been covered and then becomes a logical 1 as an opaque card region reaches the last optical sensor to be covered.

The control unit terminal 72 is connected to one input terminal of a 2-input NAND gate 116, the output terminal of which is connected to an inverting reset terminal of the flip-flop 100. The second input terminal of the NAND gate 116 is connected to control circuit terminal 64 for receiving clock pulses from the clock circuit 102. With this arrangement, the NAND gate 116 supplies a logical 1 to the reset terminal of the flip-flop 100 until the rising edge of the first clock pulse following the transition of the bridge detection signal (terminal 72) to the logical 1 state. At this point, the NAND gate 116 supplies a logical zero signal to the flip-flop reset terminal to cause the flip-flop 100 to change states. As the flip-flop 100 changes states, the signal for enabling each bridge detector circuit 56-i becomes a logical 0 to effectively disable the bridge detector circuits, and the signal for enabling the character detector circuits 60-i becomes a logical 1.

When the signal for enabling the bridge detector circuits 56-i becomes a logical 0, the output of each bridge detector NAND gate 108-i is necessarily a logical 1, thus causing the signal that is collectively supplied by the inverter circuits 110-i to make a transition from the logical 1 state to the logical 0 state. As previously described, the bridge detector circuits 56-i are effectively disabled during the character detection sequence since the signal for enabling each bridge detector 56-i remains a logical 0 until the bridge detection sequence is again initiated by the control circuit 62.

Referring now to the character detector circuits 60-i, i = 1,n, each circuit includes a flip-flop 116-i, a flip-flop 118-i, and a two-input NAND gate 120-i. The flip-flops 116-i and 118-i are arranged as a two bit shift register with the Q output terminal of each flip-flop 116-i connected to the data input terminal, D, of the associated flip-flop 118-i. The clock terminals of each flip-flop 116-i and 118-i are connected to the clock terminal 80-i of the character detector circuit 60-i for receiving clock pulses from the clock circuit 102. The inverting reset terminal of each flip-flop 116-i and 118-i is connected to the terminal 78-i for receiving the signal for enabling the character detector circuits 60-i that is supplied by the control unit 62. As shall be described, each character detector circuit 60-i is effectively disabled when the enabling signal is a logical 0 and is enabled when the character enable signal is a logical 1. Further, as shall be described, each flip-flop 116-i and 118-i is set with the Q outputs at logical 0 when the character detection sequence begins.

The Q terminal of each flip-flop 116-i is connected to one input terminal of an associated NAND gate 120-i and the second input terminal of each NAND gate 120-i is connected to the Q terminal of the associated flip-flop 118-i. Accordingly, in this arrangement, the output of each NAND gate 120-i will be a logical 1 unless the Q signal of the associated flip-flop 116-i and the Q signal of the associated flip-flop 118-i are simultaneously a logical 1, a condition which can only occur when the associated optical sensor 116-i makes a transition from the uncovered to covered state.

As in the case of the inverter circuits 110-i, the NAND gates 120-i are of the open collector variety, with the output terminals of each NAND gate 120-i being connected to the bias terminal 114 via a common load resistor 122. The signal developed at the junction between the resistor 122 and the commonly connected output terminals of the NAND gates 120-i serves as a character detection signal to indicate that character detection has occurred. Because of the common load resistor 122, the character detection signal is a logical 1 until one of the optical sensors 16-i makes a transition between the uncovered and covered states. This character detection signal is coupled to terminal 84 of the control circuit 62 to cause the system to switch from character detection to bridge detection and to supply a signal to terminal 84 to indicate that an output signal representative of the character encoded in the data column passing the optical sensors 16 is available.

More particularly, since the data terminal, D, of each flip-flop 116-i is connected to the output terminals of an associated signal shaping network 52-i, a logical 0 or a logical 1, respectively representing whether the associated optical sensor 16-i is covered or uncovered, is coupled to each flip-flop 116-i with the occurrence of each clock pulse. Thus, the state of each sensor 16-i is effectively sampled and stored within flip-flop 116-i for the duration of one clock pulse. Each clock pulse also causes the data stored in flip-flop 116-i prior to the occurrence of that clock pulse to be shifted into the associated flip-flop 118-*i*. Thus when viewed collectively, the flip-flops 116-*i* store a digital word representative of the covered or uncovered state of each sensor 116-*i* at the occurrence of the current clock pulse. Similarly, the flip-flops 118-*i* store a digital word representative of the covered or uncovered state of each optical sensor 16-*i* during the previous sample period, i.e., the state at the occurrence at the nextmost antecedent clock pulse. With the arrangement of the NAND gates 120 described above, the character detection signal remains a logical 1 until one flip-flop 116-*i* stores a logical 0 and the associated flip-flop 118-*i* simultaneously stores a logical 1. At this point, the associated optical sensor 16-*i* has made a transition from an uncovered to a covered state and the character detection signal becomes a logical 0 to indicate that the digital word stored in the flip-flops 118 is representative of the data encoded in that data column then passing by the optical sensors 16-*i* and to cause the control circuit 62 to initiate the bridge detection sequence.

The character detection signal supplied by the NAND gates 120 is supplied to the control circuit terminal 84 which is connected to an inverter circuit 124. The output terminal of the inverter 124 is connected to an output terminal 82 and is connected to the data terminal, D, of the control circuit flip-flop 100. Thus, as the character detection signal becomes a logical 0, a logical 1 is coupled to terminal 82 to signal the utilization apparatus that a digital word is collectively available at the output terminals 65-*i*, *i* = 1,*n*, that represents the coded data column then passing by the detectors 16. Coupling the inverted character detection signal to the D terminal of flip-flop 100 causes the flip-flop to change states on the falling edge of the next clock pulse. When the flip-flop 100 changes states, the signal for enabling the character detector circuits 60-*i* is switched to a logical 0 and the signal for enabling the bridge detector circuits 56-*i* is switched to a logical 1, again enabling the bridge detector circuits 56-*i*. Since the signal for enabling the character detector circuits 60-*i* is connected to the reset terminal of each character detector flip-flop 116-*i* and 118-*i* the Q signal of each flip-flop becomes a logical 0. This, in turn, causes the character detection signal supplied at the output terminals of the NAND gates 120 to return to the logical one level. Since the character detector enabling signal remains a logical 0 until the next bridge detection sequence is complete, each character detection flip-flop 116-*i* and 118-*i* will be reset to the logical 0 state with each clock pulse that occurs during the bridge detection sequence. Thus, the character detection circuits 60-*i* are effectively disabled until the character detector circuit enabling signal returns to a logical 1 at the initiation of the next character detection sequence.

It should be recognized that since the character detection flip-flops 118-*i* are initialized with logical 0's when the control circuit enables each bridge detector circuit 56-*i*, the punched data output at terminals 65 only remains valid for the duration of the character detection signal supplied to terminal 82. As previously described, the duration of the character detection signal is the period of time between the determination that a character has been detected and the falling edge of the next clock pulse. Accordingly, the data must be utilized within this time period, or stored within conventional means, such as a latch circuit, for use at any time up until the next character detection sequence is complete.

In any case, the circuit embodiment of this invention depicted in FIG. 5 is now in the bridge detection mode and ready to continue reading data columns that subsequently pass by the optical sensors 16.

Figure 6:
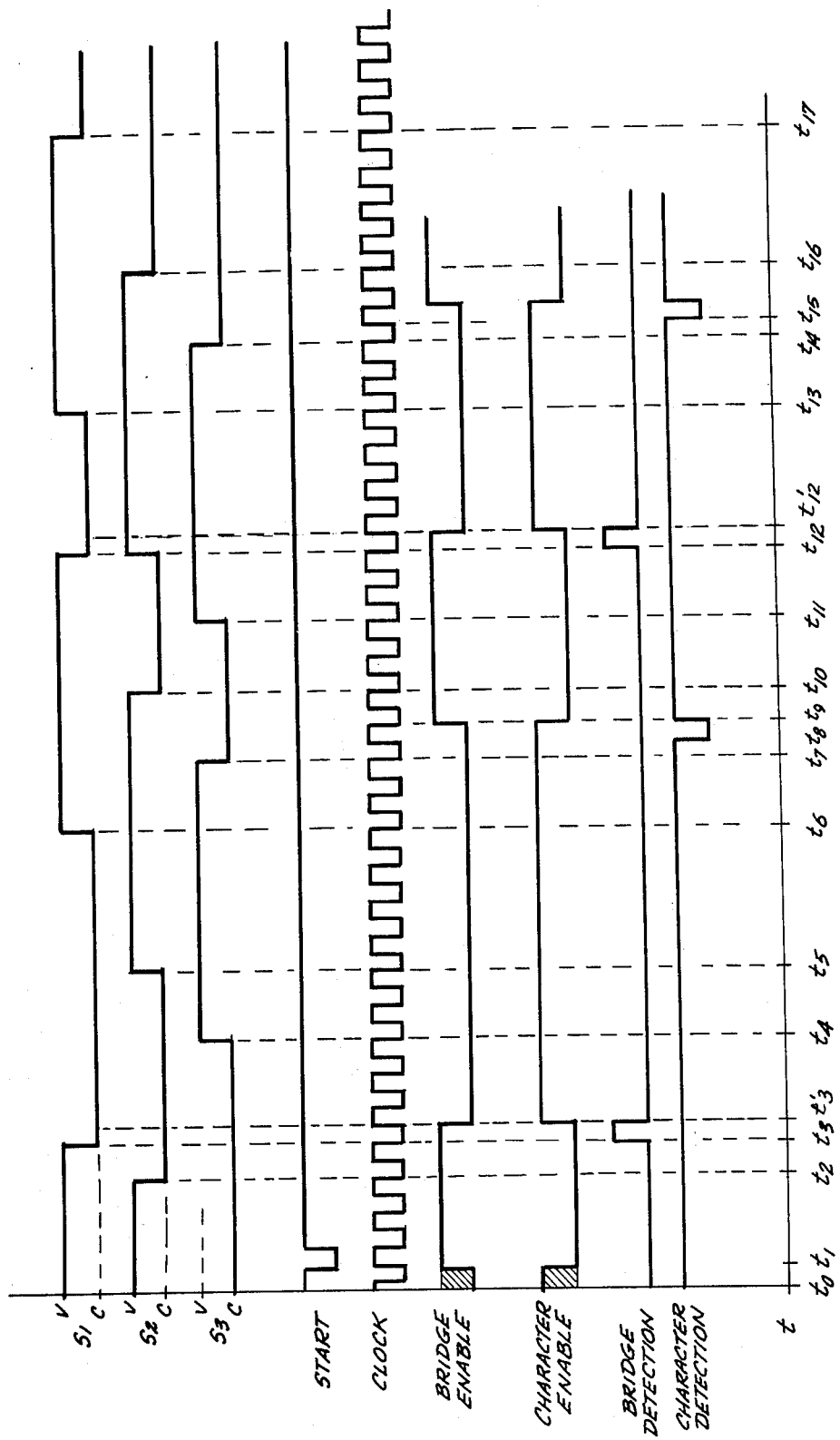
FIG. 6 graphically depicts various electrical signals useful in understanding the operation of the embodiment depicted in FIG. 5.

FIG. 6 depicts the operation of the embodiment depicted in FIG. 5 for reading two punched data columns. For simplicity, only three optical sensor signals, S1, S2, and S3, are illustrated. Thus, the situation depicted in FIG. 6 corresponds to an embodiment having only three optical sensors 16-1, 16-2, and 16-3, or a situation in which all other optical sensors are covered during the depicted time interval. That is, a situation in which the data columns being read only have punches in the data locations associated with the optical sensors 16-1, 16-2, and 16-3.

In the situation depicted in FIG. 6, the signal S1 is developed by an optical sensor 16-1 making an uncovered to covered transition at the time *t*3, a covered to uncovered transition at the time *t*6, an uncovered to covered transition at the time *t*12, a covered to uncovered transition at the time *t*13, and an uncovered to covered transition at the time *t*17. Accordingly, the signal S1 represents a first punched data location passing by the sensor 16-1 during the time interval *t*0–*t*3, a second punched data location passing by the optical sensor 16-1 during the time interval *t*6–*t*12 and a third punched data location passing by in the interval *t*13–*t*17. Similarly, the signal S2 corresponds to an optical sensor 16-2 that is exposed to (or uncovered by) a data punch during the time intervals *t*0–*t*2, *t*5–*t*10, and *t*12–*t*16. Likewise the signal S3 corresponds to an optical sensor 16-3 that is uncovered by data punches during the time intervals *t*4–*t*7 and *t*11–*t*14.

It will be recognized by those skilled in the art that the optical sensor signals S1, S2 and S3 depicted in FIG. 6 are not compatible with conventional digital circuitry that is commonly used in conjunction with the output signal supplied by a dynamic card reader. Specifically, without the use of this invention, there is no means for determining at which times the signals S1 through S3 represent data encoded in each particular data column that passes by the optical sensors. As shall be described, when the depicted signals S1 to S3 are produced by the associated optical sensors 16-1 to 16-3 in an embodiment of the invention depicted in FIG. 5, the punched data is correctly and synchronously read as two data columns that each have punches in the data locations associated with the optical sensors 16-1, 16-2, and 16-3.

Referring now to FIGS. 5 and 6, when the negative going start pulse is applied to the control circuit 62 shortly after the time *t*0, the signal for enabling the bridge detector circuits (identified as BRIDGE ENABLE in FIG. 6) is switched to the logical 1 state upon the rising edge of the next clock pulse (time *t*1 in FIG. 6). Since the signal S3 is in the covered state at time *t*3, (i.e., S3 os a logical 0), the bridge detector circuit set-reset latch comprising NAND gates 106-3 and 108-3 is immediately set to supply a logical 0 to the associated inverter circuit 110-3. At time *t*2, the optical sensor 16-2 is covered causing the set-reset latch of the bridge detector circuit 56-2 to supply a logical 0 to the associated inverter circuit 110-2. Finally, at time *t*3, the optical sensor 16-1 is covered causing the signal S1 to switch the logical 0 state, in turn, causing the set-reset latch of the bridge detector circuit 56-1 to supply a logical 0 to the inverter circuit 110-1. Since all inverter circuits 110 will then have a logical 0 input, the bridge detection signal, denoted as the BRIDGE DETECTION signal in FIG. 6, switches from the logical 0 state to the logical 1 state to indicate that the bridge detection sequence is complete.

As previously described relative to FIG. 5, the BRIDGE DETECTION signal, in combination with the next clock pulse, causes the flip-flop 100 of the control circuit 62 to switch states. When flip-flop 100 switches states, the BRIDGE ENABLE signal for enabling the bridge detector circuits 56 switches to a logical 0. When the bridge detector circuit enabling signals are switched to a logical 0, the set-reset latch of each bridge detector circuit 56 is reset thereby causing the BRIDGE DETECTION signal to be switched back to a logical zero (time t3' in FIG. 6). Since the BRIDGE ENABLE signal and character circuit enabling signal (denoted by CHARACTER ENABLE in FIG. 6) are respectively obtained from the Q and Q terminals of the control circuit flip-flop 100, the CHARACTER ENABLE signal simultaneously switches to the logical 1 state.

As the character detection sequence begins, at time t3' in FIG. 6, each optical sensor is covered and logical 0's are loaded into the two bit shift register of each character detector circuit 60 for each clock pulse occurring after time t3' and prior to time t4. When the uncovering of the optical sensor 16-3 causes the signal S3 to switch to the logical 1 state at time t4, the next clock pulse loads a logical 1 into the character detector flip-flop 116-3. When the next clock pulse occurs, the logical 1 stored in flip-flop 116-3 is transferred to the flip-flop 118-3 with each subsequent clock pulse causing both character detector flip-flop 116-3 and 118-3 to contain logical 1's as long as the optical sensor 16-3 remains uncovered (i.e., until time t7 in FIG. 6).

In a similar manner, the two clock pulses following the uncovered to covered transition of optical sensor 16-2 at time t5 and the uncovered to covered transition of optical sensor 16-1 at time t6 respectively cause a logical 1 to be entered in both data locations of the character detection shift register formed by flip-flops 116-2 and 118-2 and the character detector shift register formed by flip-flops 116-1 and 118-1. As in the case of the character detector circuit 60-3, both shift registers continue to hold logical 1's as long as the associated signals S1 and S2 are logical 1's (i.e., the associated sensors 16-1 and 16-2 are uncovered) and the CHARACTER ENABLE signal is a logical 1.

At time t7 in FIG. 6, the signal S3 makes a transition to the logical 0 state in response to the optical sensor 16-3 going from the uncovered to the covered state. As previously described relative to the circuit of FIG. 5, the next clock pulse following this transition (at time t8 in FIG. 6), causes the NAND gate 120-3 of the character detection circuit 60-3 to switch the CHARACTER DETECTION signal from a logical 1 state to a logical 0 state. This signal indicates that the logic signals stored in the character detector flip-flops 118 represent the punched data locations of that data column then passing by the optical sensor. Specifically in the depicted situation, each flip-flop 118-1, 118-2 and 118-3 contains a logical 1 and all other flip-flops 118 contain logical 0's to validly indicate that the data column being read has a punch in those data locations associated with the optical sensors 16-1, 16-2, and 16-3.

Upon the next negative going clock pulse transition (at time t9 in FIG. 6), the control circuit 62 causes the BRIDGE ENABLE signal to switch to the logical 1 state and the CHARACTER ENABLE signal to switch to the logical 0 state. As previously described, these signal transitions respectively enable the bridge detector circuits 56 by resetting each bridge detector set-reset latch and effectively disable the character detector circuits 60 by causing logical 0's to be set into each character detection flip-flop 116 and 118 for every clock pulse occurring during the bridge detection sequence. Since the character detection flip-flops 116 and 118 are set to contain logical 0's at time t9, the character detection NAND gates 120 simultaneously cause the CHARACTER DETECTION signal to return to the logical 1 state.

During the next bridge detection interval (t9 to t12 in FIG. 6), the bridge detector circuits 56-3, 56-2 and 56-1 respectively detect the covering of the optical sensors 16-3, 16-2, and 16-1 at the times t9, t10, and t12 with the covered to uncovered transition of the optical sensor 16-3 that occurs at time t11 having no effect on the circuit. Thus, bridge detection occurs at time t12 and the circuit is switched into the character detection mode of operation upon the occurrence of the first clock pulse following the bridge detection (time t12' in FIG. 6).

Since optical sensors 16-2 and 16-3 are uncovered when the character detection is initiated (time t12'), the next two clock pulses cause a logical 1 to be shifted into each storage location of the shift register included in the character detection circuit 60-2 and 60-3. Similarly, the two clock pulses following the transition of the optical sensor 16-1 to the uncovered state at time t13 causes logical 1's to be entered in the flip flops 116-1 and 118-1 that form the shift register of the character detector circuit 60-1.

At time t14 the optical sensor 16-3 goes from the uncovered to covered state and the next clock pulse (at time t15) causes generation of the CHARACTER DETECTION signal. Since each flip-flop 118-1, 118-2 and 118-3 will contain logical 1's at this time, it is again determined that a data column having a punched data location associated with sensors 16-1, 16-2 and 16-3 is passing the control by the optical sensors. As previously described, the next clock pulse causes the control circuit 62 to again initiate the bridge detection sequence and the circuit will continue to cycle through bridge detection and character detection if subsequent encoded data columns pass by the sensors 16.

Figure 7:
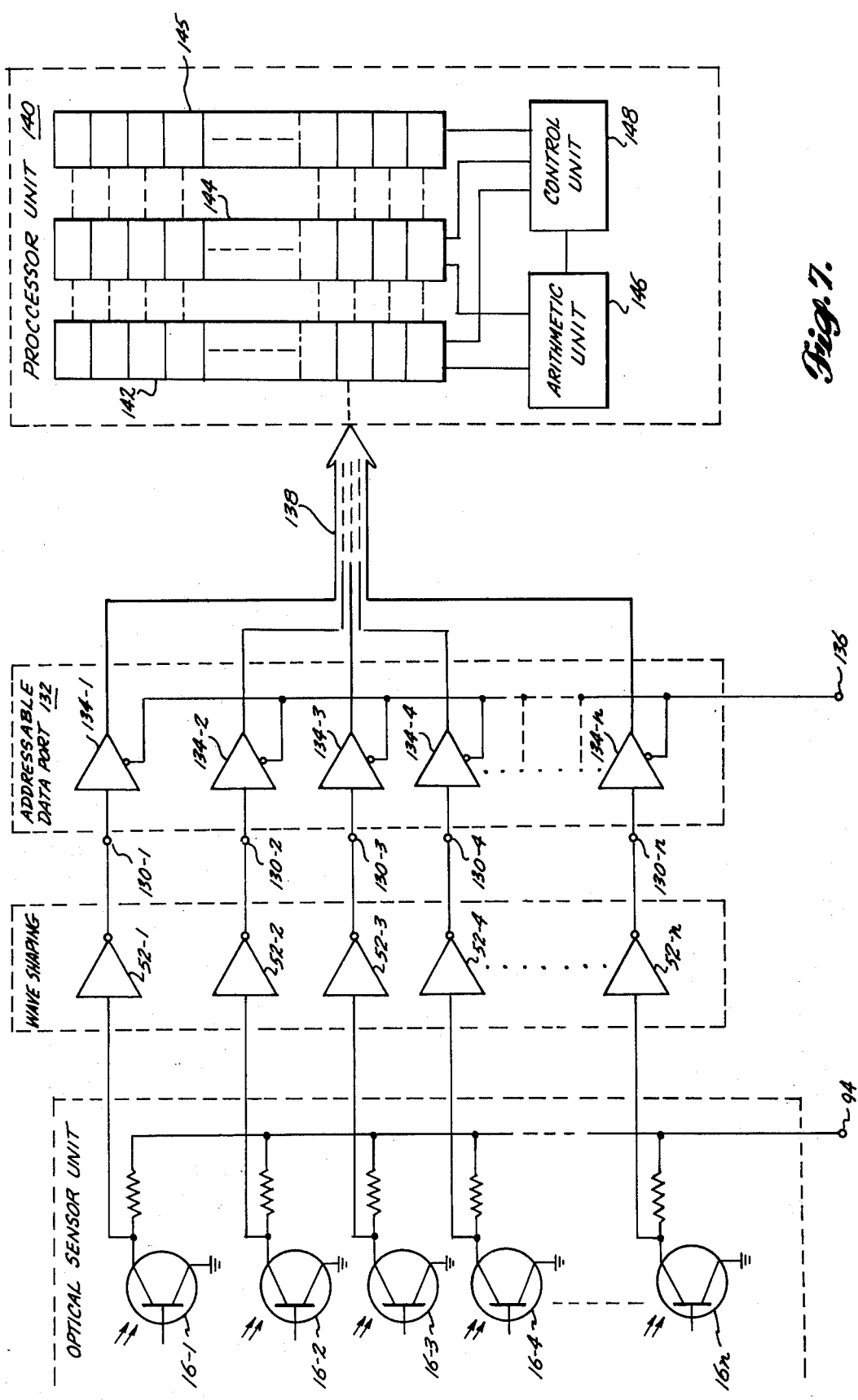
FIG. 7 is a block diagram illustrating another embodiment of this invention.

An embodiment of this invention suitable for use within a digital processing system is depicted in FIG. 7. In FIG. 7, optical sensors 16-i, i = 1,n, identical to those depicted in the embodiment of FIG. 5, are shown coupled to associated signal shaping networks 52-i, i = 1,n. As in the embodiment of FIG. 5, the signal shaping networks 52 are conventional circuits such as Schmitt trigger circuits that convert the signal supplied by each optical sensor 16-i to a rectangular or pulse signal. As previously described, the signal shaping networks 52-i are configured such that the signal at the output terminal of each circuit 52-i is a first predetermined value when the associated optical sensor 16-i is uncovered, and is a lower, second predetermined level when the associated optical sensor 16-i covered.

In the embodiment of FIG. 7, the output signal of each signal shaping network 52-i is connected to an input terminal 130-i of an addressable data port 132. The addressable data port 132 is a conventional circuit for periodically sampling the signals provided to the input terminals 130 and providing a parallel digital output signal representing the covered or uncovered state of each optical sensor 16-*i* with each pulse signal that is applied to a sampling terminal 136. In the depicted arrangement, the sampling terminal 136 is connected to sampling circuits 134-*i*, *i* = 1,*n* with the input terminal of each sampling circuit 134-*i* respectively connected to the terminal 130-*i*. Each sampling circuit 134-*i* supplies a digital signal representative of the state of the optical sensor 16-*i* to a data bus 138 that is connected to a digital processor unit 140. With this arrangement, each time a sampling pulse is applied to the terminal 136, each sampling circuit 134-*i* couples a binary signal that corresponds to the output signal supplied by the associated sensor 16-*i* to an associated conductor of the data bus 138. Sampling pulses applied to the sampling terminal 136 can be supplied by the processor unit 140, or can be supplied by any convenient source (i.e., a clock circuit) having a frequency that exceeds the maximum frequency at which punched data locations can pass by the sensors 16-*i*.

The processor unit 140 includes two storage registers 142 and 144 each having *n* storage locations, an arithmetic unit 146 for performing logic operations on the data contained in the storage registers 142 and 144, a control unit 148 for directing the operation of the arithmetic unit 146 and the storage registers 142 and 144, and a storage register 145 for storing an *n*-bit digital word representative of the last data column read by the sensors 16-*i*.

The operation of this embodiment of the invention is best understood with reference to the operational sequence diagrams or flow charts depicted in FIGS. 8 and 9. The flow diagram of FIG. 8 depicts the "decisions" performed by the processor 140 of FIG. 7 to provide operation equivalent to the bridge detection and character detection operation of the previously described embodiment of FIG. 5. As shown in FIG. 8, when the reading of the card begins, the optical sensor samples provided on the data bus 138 with each sampling strobe supplied to terminal 136 are sensed to determine if each optical sensor 16-*i* has been covered since the start of the card reading process. That is, as each set of signal samples is supplied to the processor unit 140, the control unit couples the arriving samples into the storage register 142 and causes the arithmetic unit 146 to determine if every optical sensor 16-*i* has been covered at least once after beginning the sampling sequence. Once the arithmetic unit determines that each optical sensor 16-*i* has been covered since the start of the sequence, the control unit 148 causes the processor 140 to begin the character detection sequence.

As indicated in FIG. 8, during the character detection sequence, the signal samples are again periodically sampled by the addressable data port 132 and each set of signal samples is tested to detect when at least one of the sensors 16-*i* goes from an uncovered to a covered state. During this sequence, the storage registers 142 and 144 are controlled by the control unit 148 to respectively contain the optical sensor signal supplied to the processor unit 140 during the current sampling period (i.e., the most recent pulse applied to terminal 136) and the optical sensor signal supplied to the processor 140 during the nextmost antecedent sampling period. When the arithmetic unit 146 determines an uncover to cover transition in at least one of the optical sensor 16-*i*, the binary signals contained in the storage register 144 are coupled to the storage register 145 to serve as a parallel data word that represents the data character encoded in the data column presently passing by the sensors 16-*i*.

Once the data has been transferred to the storage register 145, the control unit 148 causes the processor 140 to return to the initiation of the bridge detection sequence for reading subsequent data columns that move by the sensors 16-*i*. Thus, an *n*-bit parallel data word is made available to the storage register 145 for use by other conventional data processing arrangements included within data processor 140, or for use by other external conventional data processing circuits.

A more detailed understanding of the foregoing operational sequence of the embodiment of FIG. 7 can be ascertained from the flow diagram of FIG. 9. Within this diagram, the storage register 142 is represented by the letter A and the storage register 144 is represented by the letter B. Thus, as indicated in FIG. 9, the sequence begins with the control unit 148 causing a logical 1 to be entered into each storage location of the storage register 142. Next the control unit 148 causes the presently available signal samples, representing the state of each optical sensor, to be coupled into the storage locations of the storage register 144. The control unit then causes the arithmetic unit 146 to sequentially combine the binary signals stored in the storage locations of register 142 with the binary signals stored in corresponding storage locations of storage register 144. In this operation, the arithmetic unit 146 performs a logical AND operation on the corresponding storage locations of the storage register 142 and 144. That is, the arithmetic unit 146 performs the operation $A_i * B_i$ over the range $i = 1,n$ where $A_i$ is the binary number in the $i^{th}$ storage location of register 144, $B_i$ is the binary number in the $i^{th}$ storage location of register 142, and the symbol "*" denotes the logical AND operation.

As the corresponding elements stored in the registers 142 and 144 are so combined, the control unit 148 causes the resulting binary number to be placed in the $i^{th}$ storage location of the register 144 to replace $A_i$. Each binary number stored within storage register 144 is then tested by the arithmetic unit 146 to determine if each stored binary number is a binary 0 (i.e., by comparing each element stored within storage register 144 with 0). If each element in register 144 is a binary 0, each sensor is covered and bridge detection has occurred with the first set of optical sensor samples. If all optical sensor samples are not yet covered, the control unit 148 causes the next set of optical sensor samples to be coupled into the corresponding storage locations of the register 142 and sequences through the AND operation to determine if each optical sensor has been covered prior to the sample pulse that coupled that set of signal samples to the processor 140. The bridge detection sequence continues to cycle in the above described manner until all elements in register 144 become a logical 0 to indicate that each optical sensor 16-*i* has been covered at least once prior to that sampling time. When all binary numbers stored in register 144 become binary 0's, bridge detection is complete and the control unit 148 causes the processor 140 to enter the character detection sequence.

It will be noted that to ensure the proper operation, the processor 140 will sequence through one cycle of bridge detection prior to the arrival of another set of optical sensor samples. That is, the processor 144 shifts a set of optical signal samples into the register 142, performs the described logical AND operation and test the resulting binary numbers within the register 144 prior to the arrival of the next set of signal samples. In embodiments where the sampling signal is applied to terminal 136 by the processor 140, such satisfactory operation can be achieved by having the control unit 148 supply the sampling signal to terminal 136 at the completion of a single bridge detection cycle, i.e., after the arithmetic unit 146 has determined if each element in register 144 is a binary 0.

When the processor unit 140 enters the character detection sequence, the binary 0's stored in each storage location of the register 144 are entered into the corresponding storage locations of the register 142 to initialize the character detection sequence. The control unit 148 then causes the optical sensor samples provided by the most recent pulse applied at terminal 136 to be coupled into the register 142. The control unit 148 next causes the arithmetic unit 146 to sequentially compare the binary numbers stored in the $i^{th}$ storage location of register 142. If it is determined that a storage location of register 144 contains a binary 1 while the corresponding storage location of the register 142 simultaneously contains a binary 0, the associated optical sensor 16 has made a transition between the uncovered and covered states sometime between the current sampling time and the nextmost antecedent sampling time. When such a transition is detected, the digital word stored in register 144 is coupled to the register 145 to indicate the character encoded in that data column presently passing by the optical sensors 16.

If corresponding storage locations of register 144 and 142 do not respectively contain a binary 1 and a binary 0, no optical sensor 16 has made an uncovered to covered transition, and the control unit 148 causes the processor 140 to perform an additional cycle of character detection by replacing the binary numbers stored in register 144 with those stored in corresponding storage locations of the register 142 with the next arriving optical sensor signal samples and again detecting whether corresponding storage locations of register 144 and 142 respectively contain a binary 1 and a binary 0.

Once character detection is complete and the valid character signal is coupled to register 145, the control unit 144 causes the binary number stored in each storage location of register 142 to be replaced by the binary number contained in the corresponding storage location of register 144. The control unit 148 then causes the processor 140 to return to the bridge detection sequence whereupon the next set of optical sensor samples is coupled into the storage locations of register 142 and bridge detection resumes as described above. With this arrangement, it can be seen that the processor 140 continues to cycle between the bridge detection and character detection sequences in accordance with the data encoded on the card passing by the optical sensors 16 until each encoded data column is read. As each data column is read, an $n$-bit digital signal is made available within register 145 for whatever purpose is desired or necessary.

It will be recognized by those skilled in the art that the embodiments described herein are exemplary in nature and that many variations therein can be practiced without departing from the scope and spirit of this invention. For example, although each disclosed embodiment of the invention includes optical sensors for detecting the passing of a punched data location, any punch sensor capable of supplying a signal of a first predetermined level in response to an unpunched portion of the card and a second predetermined level in response to a punched portion of the card is suitable for use in the practice of this invention. It will in fact be recognized that this invention can be practiced with any encoding technique such as magnetic encoding or encoding portions of a card column with printed regions that contrast with the color of the card, as long as suitable sensors are provided. Further, in the embodiment of FIG. 7, the described data bus 138 can be replaced by any means for coupling the signal samples to the processor 140. A variety of such coupling means are well known within the art, including a wide range of data transmission systems, e.g., a pulse code modulation transmission system or a delta modulation system. Even further, it will be recognized that although the disclosed embodiments provide a parallel data signal for each character encoded data column, equivalent embodiments providing a serial data signal are easily implemented by those having ordinary skill in the digital circuit arts.

In summary, it can be recognized that each embodiment of the invention includes sequentially detecting the occurrence of a bridge condition and a character detection condition according to the characters encoded in data columns of a card passing by a sensor array. In this respect, bridge detection has herein been defined as detecting when an unencoded card region (e.g., an unpunched card region) has reached each sensor following the initiation of the bridge detection sequence and character detection has herein been defined as detecting when a first encoded region (e.g., a data punch) passes from one of the sensors following the initiation of the character detection sequence, i.e., a first sensor undergoes a transition between being exposed to an encoded card region and being exposed to an unencoded region. In each embodiment, each sensor is periodically sampled during the character detection sequence and a current sample and a nextmost antecedent sample are stored. At the conclusion of the character detection sequence, the nextmost antecedent sample of each sensor represents the character encoded in that data column passing the sensors when the current signal samples were obtained.

What is claimed is:

1. Card reading apparatus for reading the information recorded on a card wherein a card having data encoded regions arranged in columnar format to represent a character of information with each columnar region including a plurality of data locations is moved in parallel with and past an aligned array of sensors to expose each of said sensors to the encoded and unencoded data locations in each of said columnar card regions, said card reading apparatus comprising:

bridge detection means enabled in response to a first control signal for determining when each of said sensors has been exposed to an unencoded region of said card at least once after the time at which said first control signal is applied;

character detection means enabled in response to a second control signal for determining when a first one of said sensors is exposed to an unencoded data location after first being exposed to an encoded region of said card, said detection occurring after said second control signal is applied; and control means for supplying said first and second control signals, said control means supplying said first control signal when said card is moved by said sensor means at a time prior to the time at which the first encoded card region reaches said sensors, said control means further supplying said first control signal each time said character detection means detects said first one of said sensors to be exposed to by said sensors at the occurrence of said nextmost antecedent pulse of said applied periodic pulse signal and means for supplying a fourth predetermined control signal; and control means responsive to said second and fourth predetermined control signals for supplying said first and second predetermined control signals, said control means including means for supplying said first predetermined control signal when said fourth predetermined control signal is supplied by said character detection means and means for supplying said third predetermined control signal when said second predetermined control signal is supplied by said bridge detection means, said control means further including means for supplying said first predetermined control signal prior to the time at which the first data punch of a card moving through said card guide means reaches said plurality of sensors.

6. The dynamic card reader of claim 5, wherein each of said sensors are photo detectors mounted on said card guide means to be in spaced juxtaposition with the first planar surface of the card moving through said card guide means, each of said photo detectors sensitive to impinging light energy to supply said first predetermined signal when an opaque card region passes by said photo detector and to supply said second predetermined signal when a data punch passes by said photo detector, said dynamic card reader further comprising optical source means mounted on said card guide means for illuminating the second planar face of said card moving through said card guide means with light energy.

7. In a dynamic card reader for reading data from a card having at least one data column that is substantially parallel to one edge of said card, each of said data columns including a plurality of data locations for the encoding of an information character wherein said card is moved past an aligned array of sensors for detecting whether a coded data location or an uncoded card region is passing by said aligned sensors, said aligned array of sensors being arranged such that said card moves by said aligned sensors with each of said data columns substantially aligned with said sensor array, the improvement comprising signal processing means for supplying an output signal representative of the character encoded in each encoded data column passing by said sensor array regardless of whether said data columns pass in precise alignment with said sensors, said signal processing means including:

first detection means for detecting a first condition wherein at least one uncoded card region has reached each of said sensors since the last time at which said signal processing means supplied said output signal representing a character encoded in a data column passing by said sensor array; and second detection means operable after said first detection means detects said first condition, said second detection means for detecting a second condition wherein a first one of said sensors is exposed to an unecoded card region after first being exposed to an encoded data location, said second detection means including means for supplying a signal indicative of those ones of said sensors that were exposed to an encoded data location immediately prior to the detection of said second condition as said output signal.

8. The dynamic card reader of claim 7 wherein said signal processing means further comprises control means for sequentially activating said first and second detection means, said control means including means for activating said first detection means each time an output signal is supplied by said second detection means, said control means further including means for activating said second detection means when said first detection means detects said first condition.

9. In a dynamic card reader for reading punched data locations arranged in columns on a card wherein each column of data locations is substantially parallel to one edge of said card and said card is read by moving said card past a linear array of punch sensors arranged to be substantially parallel with each data column that moves by said linear array of punch sensors, each of said punch sensors supplying a first predetermined signal when exposed to a punched data location of a passing data column and supplying a second predetermined signal when exposed to an unpunched region of said card, the improvement comprising signal processing means for synchronously supplying a digital signal representing the punched data locations of each of said data columns as said data columns move by said aligned sensors, said signal processing means including:

first detector means connected to each of said sensors for supplying a first control signal when each of said sensors have supplied said second predetermined signal, said first detector means responsive to an applied first binary signal having a first and second signal level to enable said first detector means whenever said first binary signal is said first signal level and disables said first detector means whenever said applied binary signal is said second signal level;

second detector means connected to each of said sensors for supplying a second control signal when one of said sensors supplies said second predetermined signal after having supplied said first predetermined signal, said second detector means responsive to an applied second binary signal having a first and second signal level to enable said second detector means when said second binary signal is said first signal level and disable said second detector means when said second binary signal is said second signal level;

control means responsive to said first and second control signals supplied by said first detector means and said second detector means for supplying said first and second binary signals, said control means supplying said first binary signal at said first signal level and said second binary signal at said second signal level in response to said second control signal supplied by said second detector means, said control means supplying said first binary signal at said second signal level and said second binary signal at said first signal level in response to said first control signal supplied by said first detector means; and output means for supplying a digital signal encoded to represent those ones of said sensors supplying said first predetermined signal immediately prior to the time at which said second detector means supplies said second control signal.

10. The dynamic card reader of claim 9 wherein said first detector means includes a plurality of digital latch circuits, means for inverting the output signal supplied by each of said latch circuits, and means for performing a logical AND operation on the inverted output signals of said latch circuits. Each of said latch circuits connected to one of said sensors and responsive to said first an unencoded card region after being exposed to an encoded card region, said control means supplying said second control signal each time said bridge detection means determines that each of said sensors has been exposed to an unencoded card region at least once following the time at which said first control signal is applied.

2. The card reading apparatus of claim 1, wherein said character detection means comprises:

memory means responsive to an applied periodic clock signal, said memory means including means for simultaneously storing a first signal representative of whether each of said sensors is exposed to an encoded or an unencoded region of said card when a particular clock pulse is applied to said memory means and a second signal representative of whether each of said sensors was exposed to an encoded or unencoded region of said card when the nextmost antecedent clock pulse was applied to said memory means; and means for comparing said stored first and second signals associated with each of said sensors to determine if one of said sensors has been exposed to an unencoded region of said card after first being exposed to an encoded region of said card.

3. The card reading apparatus of claim 2, wherein said control means includes means for providing said second stored signal of said character detection memory means as a digital signal representative of that encoded columnar region then passing by said sensor means whenever said means for comparing said first and second stored signals determines that one of said sensors has been exposed to an unencoded region of said card after first being exposed to an encoded region of said card, said character detection memory means further including means for storing a predetermined binary number in said memory means prior to the application of said second control signal to said character detection means.

4. The card reading apparatus of claim 1, wherein said bridge detection means includes a plurality of set-reset latch circuits, each of said latch circuits being associated with a particular one of said sensors, each of said latch circuits supplying a first logic signal as soon as said associated sensor is exposed to an unencoded card region, each of said latch circuits supplying a second logic signal when said associated sensor is exposed to an encoded card region and has not yet been exposed to an unencoded card region after the application of said first control signal, each of said latch circuits including means to reset said latch circuit to supply said second logic signal in response to said second control signal supplied by said control means, said bridge detection means further including logic circuitry means responsive to said first and second logic signals supplied by each of said latch circuits, said logic circuit means including means for inverting each of said signals supplied by said latch circuits and means for combining said inverted signals in a logical AND operation.

5. A dynamic card reader for synchronously reading information characters encoded as one or more punches in data locations arranged in columnar format on a card comprising:

card guide means for directing the movement of a card along a predetermined path;

a plurality of sensors for determining punched data locations, said plurality of sensors being mounted to said card guide means with each of said sensors arranged to detect data punches within a particular data location of each columnar card region as a card is moved through said card guide means to pass by said plurality of sensors, each of said sensors supplying a first predetermined signal when said sensor detects the absence of a punch in said card and supplying a second predetermined signal when said sensor detects a punch in said card;

a plurality of signal shaping means responsive to the signals supplied by said sensors, each of said signal shaping means associated with a single one of said sensors to supply a first predetermined binary number when said associated sensor supplies said first predetermined signal and to supply a second predetermined binary number when said associated sensor supplies said second predetermined signal;

bridge detection means responsive to an applied first predetermined control signal and responsive to said first and second binary numbers supplied by each of said signal shaping means, said bridge detection means for detecting a bridge condition at the time at which said first predetermined binary number has been supplied at least once by each of said signal shaping means while said first predetermined control signal is applied to said bridge detection means, said bridge detection means including means for supplying a second predetermined control signal when said bridge condition is detected;

character detection means responsive to an applied third predetermined control signal and responsive to said first and second binary numbers supplied by each of said signal shaping means, said character detection means further responsive to an applied periodic pulse signal whenever said third predetermined control signal is applied to said character detection means, said character detection means including first memory means for storing the binary numbers supplied by each of said signal shaping means at the occurrence of a particular pulse of said applied periodic pulse signal when said third predetermined control signal is applied to said character detection means, said character detection means including a second memory means for storing the binary numbers supplied by each of said signal shaping means at the nextmost antecedent pulse of said applied periodic pulse signal relative to said particular pulse, said second memory means storing said binary numbers supplied by each of said signal shaping means only while said third predetermined control signal is applied to said character detection means, said character detection means further including means for comparing said binary numbers supplied by each of said signal shaping means at the occurrence of said particular pulse of said periodic pulse signal with the binary number supplied by the same one of said signal shaping means at the occurrence of nextmost antecedent pulse of said applied periodic pulse signal, and means for detecting a character detection condition at the time that said comparing means detects that at least one of said signal shaping networks supplied said first predetermined binary number at the occurrence of said particular pulse and supplied said second predetermined binary number at the occurrence of said nextmost antecedent pulse, said character detection means further including means for supplying said binary number stored within said second memory means as a digital word representing the information character encoded in that data column passing binary signal to supply a latch output signal having a first predetermined binary level when said first binary signal is said first predetermined signal level and the particular sensor associated with said latch circuit has supplied said second predetermined signal, each of said latch circuits supplying a latch output signal of a second predetermined binary level when said first binary signal is said second signal level, said means for performing said logical AND operation including means for supplying a signal resulting from said AND operation as said first control signal.

11. The dynamic card reader of claim 10 wherein said second detector means includes register means responsive to an applied periodic clock signal for storing the signal supplied by each of said sensors, said register means storing the signal supplied by each of said sensors at the time of a particular clock pulse of said periodic clock signal and storing the signals supplied by each of sensors at the time of the nextmost antecedent clock pulse whenever said second binary signal is said first signal level said second detector means further including means for comparing each signal stored in response to said nextmost antecedent clock pulse with the stored signal supplied by the same sensor in response to said particular clock pulse, said comparing means supplying said second control signal whenever said signal stored in response to said nextmost antecedent clock pulse represents said first predetermined signal supplied by one of said sensors and said signal stored in response to said particular clock pulse represents said second predetermined signal supplied by that same one of said sensors, said second detector register means further responsive to said second binary signal for storing signals corresponding to said second signal supplied by said sensors whenever said second binary signal is said second signal level.

12. The dynamic card reader of claim 11 wherein said output means includes means for supplying those signal stored in response to said nextmost antecedent clock pulse at the time said second detector means supplies said second control signal as said digital signal.

13. A method of reading information recorded on a card at one or more encoded data locations within at least one data column that includes a plurality of such data locations wherein each data column is substantially parallel to one edge of said card and said card is moved past an aligned array of sensors arranged such that said edge of said card is maintained substantially parallel to said aligned sensor array with each of said sensors supplying a signal indicative of whether an encoded data location or an unencoded region of said card is presently passing by each of said sensors comprising the steps of:
 a. monitoring the signal supplied by each of said sensors to determine the time at which each of said sensors have supplied a signal indicative of a passing unencoded region of said card following the initiation of said signal monitoring;
 b. again monitoring the signal supplied by each of said sensors to determine the time at which at least one of said sensors supplies a signal indicative of a passing unencoded region of said card after first supplying a signal indicative of a passing encoded data location;
 c. supplying a signal representative of those sensors that supplied a signal indicative of a passing encoded data location at a moment of time immediately prior to the time at which at least one of said sensors supplies said signal indicative of a passing unencoded card region after first supplying a signal indicative of a passing encoded data location; and
 d. repeating steps a, b, and c as long as encoded data columns pass by said sensor array.

14. The method of claim 13 wherein said step of again monitoring the signal supplied by each of said sensors includes the steps of:
 a. periodically sampling the signal supplied by each of said sensors;
 b. comparing the signal supplied by each of said sensors at each sampling time with the signal supplied by that same sensor at the next sampling time;
 c. detecting when at least one of said sensors supplies a signal indicative of a passing encoded data location at a particular one of said sampling times and supplies a signal indicative of a passing unencoded card region at the sampling time following said particular one of said sampling times.

15. The method of synchronously determining the information character encoded as one or more punched data locations of at least one columnar region of a card being moved past an array of sensors wherein each sensor supplies an electrical signal indicative of whether a punched or unpunched card region is currently passing by said sensor comprising the steps of:
 a. performing a first periodic sampling of each signal supplied by said array of sensors to detect the time at which an unpunched card region has reached each sensor following the onset of said first periodic sampling;
 b. performing a second periodic sampling of each signal supplied by said array of sensors following the detection that an unpunched region has reached each sensor during said first periodic sampling;
 c. comparing the signal sample supplied by each of said sensors at a first predetermined sampling time during said second periodic sampling with the signal sample supplied by the same sensor at the nextmost antecedent sampling time of said second periodic sampling;
 d. detecting when one of said sensors supplies a signal at said first predetermined sampling time during said second periodic sampling that indicates an unpunched card region passing by said sensor and the same one of said sensors supplies a signal at said nextmost antecedent sampling time of said second periodic sampling that indicates a punched region is passing by said sensor;
 e. supplying said signal supplied by each of said sensors at said nextmost antecedent sampling time of said second periodic sampling as a digital word representative of the information character encoded in that columnar region of said card passing by said sensors at said first sample time of said second periodic sampling; and
 f. repeating steps a, b, c, d and e until said card has passed completely by said sensors.

* * * * *